US008817037B2

(12) United States Patent
Yun

(10) Patent No.: US 8,817,037 B2
(45) Date of Patent: Aug. 26, 2014

(54) RECONSTRUCTING THREE DIMENSIONAL OIL PAINTINGS

(75) Inventor: Il Dong Yun, Seongnam-si (KR)

(73) Assignee: Hankuk University of Foreign Studies Research and Industry-University Cooperation Foundation, Yongin-si (KR)

( * ) Notice: Subject to any disclaimer, the term of this patent is extended or adjusted under 35 U.S.C. 154(b) by 1048 days.

(21) Appl. No.: 12/303,546

(22) PCT Filed: Feb. 25, 2008

(86) PCT No.: PCT/KR2008/001078
§ 371 (c)(1),
(2), (4) Date: Oct. 29, 2009

(87) PCT Pub. No.: WO2008/105606
PCT Pub. Date: Sep. 4, 2008

(65) Prior Publication Data
US 2010/0039427 A1    Feb. 18, 2010

(30) Foreign Application Priority Data
Feb. 26, 2007    (KR) .................. 10-2007-0019095

(51) Int. Cl.
*G09G 5/02*    (2006.01)
*G06T 15/00*    (2011.01)
*G06T 15/10*    (2011.01)
*G06T 15/20*    (2011.01)
*G06T 15/50*    (2011.01)

(52) U.S. Cl.
USPC ........... 345/589; 345/419; 345/426; 345/427; 345/593

(58) Field of Classification Search
CPC ........ G06T 11/001; G06T 15/02; G06T 15/04
USPC ......... 345/419-427, 519-522, 581, 589, 593; 382/190-191, 260-265, 276
See application file for complete search history.

(56) References Cited

U.S. PATENT DOCUMENTS 4,888,713 A * 12/1989 Falk .............................. 345/582
5,687,304 A * 11/1997 Kiss ............................. 345/419
(Continued)

FOREIGN PATENT DOCUMENTS

| KR | 100151918 | 6/1998 |
| KR | 1020020056594 | 7/2002 |
| WO | WO 02/082378 | 10/2002 |

OTHER PUBLICATIONS

Doug DeCarlo, Anthony Santella, Stylization and Abstraction of Photographs, 2002, Proceedings of SIGGRAPH 2002, p. 769-776.*

(Continued)

*Primary Examiner* — Xiao Wu
*Assistant Examiner* — Michael J Cobb
(74) *Attorney, Agent, or Firm* — NSIP Law

(57) ABSTRACT

Techniques for generating three dimensional image data with brushstroke effects from a two dimensional image is disclosed. One or more three dimensional brushstroke patterns from at least one brushstroke are generated. A two dimensional image is partitioned into one or more color regions. For each color region, each three dimensional brushstroke pattern is transformed to obtain a brushstroke effect. Each transformed three dimensional brushstroke pattern is then applied to each color region to generate a three dimensional image data having the brushstroke effect.

53 Claims, 13 Drawing Sheets

(56) References Cited

U.S. PATENT DOCUMENTS

| | | | |
|---|---|---|---|
| 5,710,878 A * | 1/1998 | McCoy et al. | 345/581 |
| 5,809,179 A * | 9/1998 | Marimont et al. | 382/254 |
| 6,639,595 B1 * | 10/2003 | Drebin et al. | 345/426 |
| 6,765,589 B1 * | 7/2004 | Georgiev et al. | 345/646 |
| 7,158,138 B1 * | 1/2007 | Bronskill et al. | 345/441 |
| 2003/0206178 A1 * | 11/2003 | Hoppe et al. | 345/582 |
| 2004/0150642 A1 * | 8/2004 | Borshukov et al. | 345/426 |
| 2004/0233196 A1 * | 11/2004 | Hertzmann | 345/441 |
| 2005/0001854 A1 * | 1/2005 | Schuster et al. | 345/639 |
| 2006/0082579 A1 | 4/2006 | Yao | |
| 2006/0087519 A1 * | 4/2006 | Berger et al. | 345/619 |
| 2009/0021521 A1 * | 1/2009 | Sorgard et al. | 345/582 |
| 2010/0033492 A1 * | 2/2010 | Stewart | 345/584 |

OTHER PUBLICATIONS

Aaron Hertzmann, Fast Paint Texture, 2002, Proc. 2nd Annual Symposium on Non-Photorealistic Animation and Rendering (NPAR 2002), p. 91-96,161.*

Aaron Hertzmann, Painterly Rendering with Curved Brush Strokes of Multiple Sizes, 1998, Proceedings of SIGGRAPH 1998, p. 453-460.*

James Hays, Irfan Essa, Image and Video Based Painterly Animation, 2004, Proceedings of the 3rd International Symposium on Non-Photorealistic Animation and Rendering (NPAR 2004), p. 113-120, 154.*

Kyong Joon Lee, Dong Hwan Kim, Il Dong Yun, Sang Uk Lee, Three-dimensional oil painting reconstruction with stroke based rendering, 2007, Visual Computer, 23:873-880.*

Hamish Carr, Perspective Projection, 2005, Introductory Computer Graphics—Course Notes, University College Dublin, Dublin Ireland.*

The Geometry Center, 3.3 Projective Transformations, 1995, http://www.geom.uiuc.edu/docs/reference/CRC-formulas/node16.html.*

G. McGunnigle, M.J. Chantler, Photometric Stereo and Painterly Rendering, 2002, Research Memorandum, Heriot-Watt University.*

Ronen Basri, David Jacobs, Ira Kemelmacher, Photometric Stereo with General, Unknown Lighting, 2006, International Journal of Computer Vision, DOI: 10.1007/s11263-006-8815-7.*

Aaron Hertzmann, Algorithms for Rendering in Artistic Styles, 2001, DissertationDissertation, New York University, New York, NY.*

Michio Shiraishi, Yasushi Yamaguchi, An Algorithm for Automatic Painterly Rendering Based on Local Source Image Approximation, 2000, Proceedings of the 1st international symposium on Non-photorealistic animation and rendering NPAR '00, p. 53-58.*

Bart Adams, Martin Wicke, Philip Dutré, Markus Gross, Mark Pauly, Matthias Teschner, Interactive 3D Painting on Point-Sampled Objects, 2004, Proceedings of the First Eurographics conference on Point-Based Graphics SPBG'04, p. 57-66.*

Wong, Artistic Rendering of Portrait Photographs, 1999, Thesis, Cornell University, Ithaca, NY.*

Per H. Christensen, Linda G. Shapiro, Three-Dimensional Shape from Color Photometric Stereo, 1994, International Journal of Computer Vision, 13(2):213-227.*

International Search Report for corresponding PCT Application No. PCT/KR2008/001078 mailed Jun. 13, 2008.

International Written Opinion for corresponding PCT Application No. PCT/KR2008/001078 mailed Jun. 13, 2008.

* cited by examiner

RECONSTRUCTING THREE DIMENSIONAL OIL PAINTINGS

RELATED APPLICATIONS

This application is the U.S. National Phase under 35 U.S.C. §371 of International Application No. PCT/KR2008/001078 entitled RECONSTRUCTING THREE DIMENSIONAL OIL PAINTINGS, filed Feb. 25, 2008, designating the U.S. and published in English on Sep. 4, 2008 as WO 2008/105606, which claims priority under 35 U.S.C. §119(a)-(d) to Korean Patent Application No. KR1020070019095, filed Feb. 26, 2007. The content of these applications are incorporated herein by reference in their entireties.

TECHNICAL FIELD

The present disclosure relates to image processing and, more particularly, reconstructing three-dimensional image data from two-dimensional images.

BACKGROUND

Oil paintings are usually considered to be two dimensional (2D) images. On closer inspection, however, oil paintings typically contain many brushstrokes, each of which is unique from the other brushstrokes. For example, each brushstroke is characterized by a unique height and color, and creates a unique texture effect according to the oil color thickness of the individual brushstroke. Therefore, oil paintings can be considered three dimensional (3D) structures having various texture effects.

The difference between the brushstrokes is in the height of the brushstrokes, which is caused from the thickness difference of the oil colors. This difference can be very small. Typically, laser scanners are used to obtain high resolution 3D data of a 3D structure having texture effects. However, even high resolution laser scanners may not provide sufficient resolution to adequately represent 3D structures of oil paintings that have very minute texture effects.

With regard to image processing, 3D oil painting reconstruction is related to artistic filters, in which various painting styles, including oil, watercolor, and line art renderings are synthesized based on either digitally filtered or scanned real-world examples. Work has been done in creating artistic styles by computer, often referred to as non-photorealistic rendering. Most of these works have been related to a specific rendering style. In various conventional image analogy techniques, a user presents two source images with the same content which are aligned, but with two different styles. Given a new input image in one of the above styles, the mapping from an input image to an aligned image of the same scene in a different style is estimated. The aligned image pair with the same scene but in a different image style, however, is often unavailable.

In another conventional technique, for a given input image, only one source image of an unrelated scene that contains the appropriate style is required. In this case, the unknown mapping between the images is inferred by Bayesian technique based on belief propagation and expectation maximization. These conventional techniques, however, have been typically limited to 2-dimensional image construction in which only limited types of texture effects were reconstructed.

SUMMARY

The present disclosure provides techniques for generating three dimensional image data with brushstroke effects from a two dimensional image. Brushstroke pattern data is obtained from sample brushstrokes and the pattern data is used to form three dimensional mesh data. The brushstroke pattern data is then applied to the three dimensional mesh data. Accordingly, any two dimensional image can be effectively and efficiently transformed into a three dimensional image having brushstroke effects.

In one embodiment, a method for generating three dimensional image data with brushstroke effects from a two dimensional image includes generating one or more three dimensional brushstroke patterns from at least one brushstroke. A two dimensional image is partitioned into one or more color regions. For each color region, each three dimensional brushstroke pattern is transformed to obtain a brushstroke effect. Each transformed, three dimensional brushstroke pattern is then applied to each color region to generate a three dimensional image data having the brushstroke effect.

In another embodiment, a method for reconstructing three dimensional image data with brushstroke effects from a two dimensional image includes: (i) segmenting a two dimensional image into one or more color regions; (ii) generating three dimensional brushstroke pattern data of at least one sample brushstroke; (iii) for each color region, transforming the three dimensional brushstroke pattern data to generate a deformed 3-dimensional brushstroke pattern data; and (iv) applying the transformed three dimensional brushstroke pattern data to each color region to generate a three dimensional image data.

In still another embodiment, a method for generating three dimensional image data with brushstroke effects from a two dimensional image is provided. In this method, one or more three dimensional brushstroke patterns are generated from at least one brushstrokes. A two dimensional image is partitioned into one or more color regions. Then for each color region, each three dimensional brushstroke pattern is transformed to obtain a brushstroke effect and a mesh data is obtained to generate a brushstroke image to be mapped to the mesh data. The brushstroke image is then to the mesh data to generate a three dimensional image data having the brushstroke effect.

In yet another embodiment, a computer readable medium storing instructions causing a computer program to execute the method for generating three dimensional image data with brushstroke effects from a two dimensional image is provided.

DETAILED DESCRIPTION

In the following description, numerous specific details are set forth. It will be apparent, however, that the described embodiments may be practiced without some or all of these specific details. In other instances, well known process operations have not been described in detail in order not to unnecessarily obscure the present disclosure.

Figure 1:
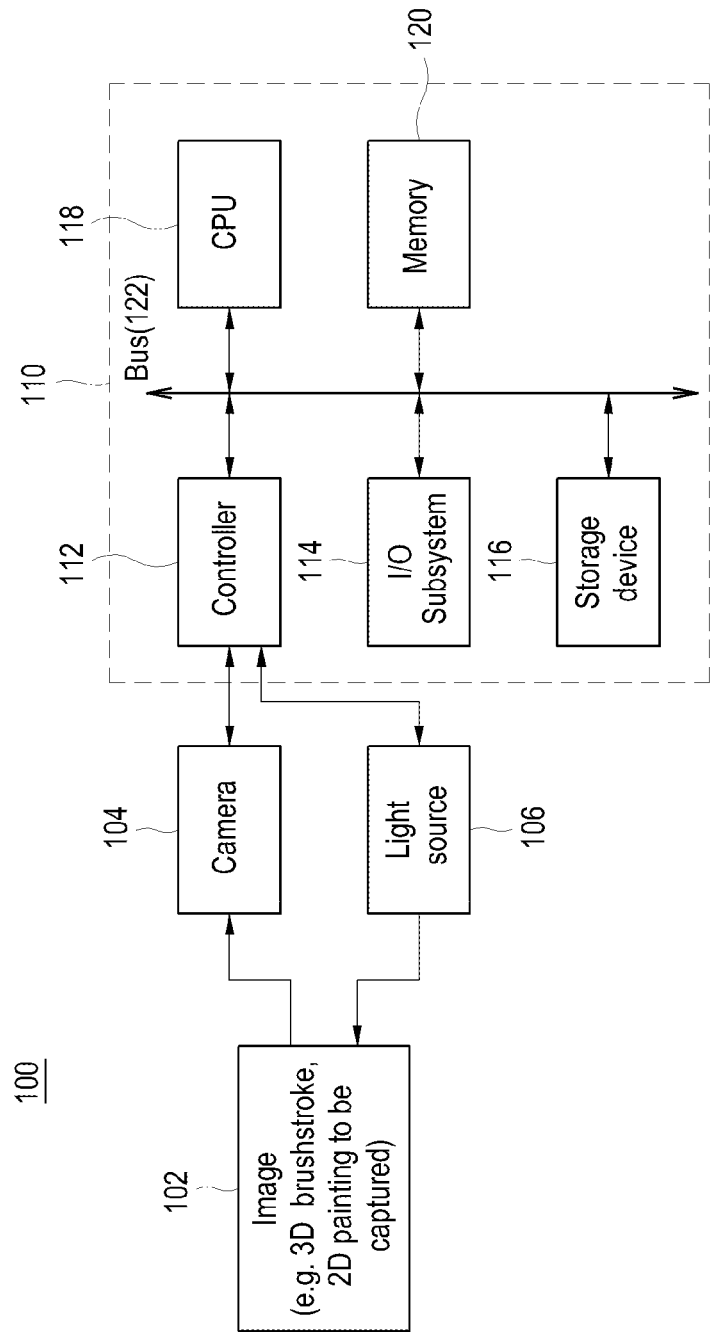
FIG. 1 shows a schematic diagram of an example system to implement one embodiment of a method for reconstructing 3-dimensional data having texture effects, in accordance with one embodiment.

FIG. 1 illustrates a schematic diagram of an example imaging system 100 in which embodiments of the present disclosure may be implemented. Imaging system 100 includes a camera 104, a light source 106 and a computer system 110. Computer system 110 includes a controller 112, an I/O subsystem 114 (e.g., keyboard, mouse, trackball, etc.), a storage device 116 (e.g., mass storage device, hard disk drive, etc.), a CPU 118 and a memory 120 (e.g., random access memory), which are connected to each other via a bus 122. Camera 104 and light source 106 are operatively coupled to controller 112 of computer 110 for communicating control and data signals.

In this configuration, controller 112 controls the operation of camera 104 and the position of light source 106. Light source 106 provides light in different directions under the control of controller 112 to form reflected images 102 of real 3D brushstrokes in accordance with a photometric stereo method using a hybrid reflection model. Camera 104 captures images 102 such as 3D brushstrokes and 2D paintings under the control of controller 112. In an alternative embodiment, any apparatus such as a scanner that is capable of obtaining 2D or 3D data from real objects or images may be used instead of camera 104. Storage device 116 is a mass storage device such as an optical disk, a hard disk drive, etc., and stores computer instructions implementing one or more methods for reconstructing 3D data with brushstroke effects. The instructions may be loaded into memory 120 (e.g., RAM) and provided to CPU 118, which may execute the computer instructions for reconstructing 3D data with brushstroke effects.

According to one embodiment, N images for each brushstroke among several sample brushstrokes are obtained by using light source 106 and camera 104 under the control of controller 112. The N images are used to obtain brushstroke pattern data for the sample brushstrokes by using a photometric stereo method using a hybrid reflection model as described in FIG. 2 below. Once the sample brushstroke pattern data has been obtained, an image of a 2D painting to be 3-dimensionally reconstructed is captured via camera 112. After the 2D, image is obtained, color segmentation is applied. For each color region in the 2D image, a transformation of the 3D brushstroke pattern obtained from the images is performed to obtain various 3D brushstroke patterns. In this process, each transformed 3D brushstroke is iteratively applied to each color region to generate 3D image with brushstroke effects. It should be appreciated, however, that the techniques disclosed are not limited to any specific 3-D reconstruction method for obtaining 3-D data of brushstroke patterns.

FIGS. 2-9 illustrate methods for obtaining brushstroke pattern data from real brushstrokes by employing a photometric stereo method using a hybrid reflection model to obtain brushstroke pattern data from N images on each of several sample brushstrokes.

Brushstrokes are real 3D objects having distinct shape, height and texture effects. Considering that real oil paintings include a large number of different brushstrokes, obtaining as much brushstroke pattern data as possible is helpful to reconstruct 3-D data with texture effects. However, for the sake of efficiency in the image processing, the perspective transformation is iteratively performed to generate various brushstroke pattern data from the pattern data of a few sample brushstrokes. The number of sample brushstrokes may be determined by various factors including, for example, the size of the input image, the sample brushstroke and the segment formed by the color segmentation. For example, even one or two sample brushstrokes may provide sufficient oil painting texture effects through proper perspective transformation. The number of sample brushstrokes may also be selected to represent a painter's brushstroke style. For a more realistic 3-D reconstruction, real brushstrokes of known painters may be selected as sample brushstrokes.

Before explaining the photometric stereo method illustrated in FIG. 2, an image construction model and error estimation process according to one embodiment will be discussed below.

Figure 3:
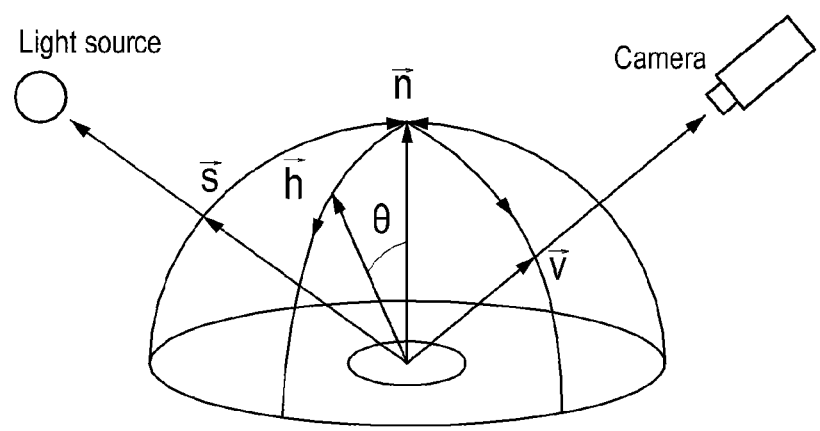
FIG. 3 illustrates an image construction model used in the photometric stereo method, in accordance with one embodiment.

In general, reflected light includes both diffuse reflection components and specular reflection components. In the hybrid reflection model in accordance with one embodiment, the diffuse reflection components may be approximated by using the Lambertian model, and the specular reflection components may be approximated by using the Torrance-sparrow model. FIG. 3 shows an image construction model used for defining the hybrid reflection model in the photometric stereo method, in accordance with one embodiment. All the vectors illustrated in FIG. 3 are unit vectors, where n is a normal vector of the surface of the brushstroke, v is a directional vector from the surface of the brushstroke to camera 104, and s is a directional vector from the surface of the brushstroke to light source 106. The vector h is a directional vector of the specular reflection defined as follows:

$$\vec{h} = \frac{\vec{s} + \vec{v}}{\|\vec{s} + \vec{v}\|} \qquad \text{[Equation 1]}$$

Under the image construction model of FIG. 3, generalized radiance L obtained by camera 104 is composed of a diffuse reflection component, $L_D$, and a specular reflection component, $L_S$, as follows:

$$L = L_D + L_S \qquad \text{[Equation 2]}$$
$$= \rho_D(\vec{s} \cdot \vec{n}) + \rho_S \frac{\exp(-k\theta^2)}{\vec{v} \cdot \vec{n}}$$

where $\rho_D$ is a diffuse reflection albedo, $\rho_S$ is a specular reflection albedo, k is a texture parameter of the surface, and $\theta = \cos^{-1}(\vec{h} \cdot \vec{h})$ is an angle (rad) between vectors n and h. In the hybrid model, variables n, $\rho_D$, $\rho_S$ and k are estimated to determine the diffuse reflection surface value and the specular reflection surface value by using error indexes from N different images of one sample brushstroke.

For error estimation, an error index is defined in terms of radiance of N images, the hybrid reflection model, and mathematical stability of the estimated values, as follows:

$$E = \sum_{k=1}^{N} \|I_k - \hat{I}_k\| \qquad \text{[Equation 3]}$$

$$= \sum_{k=1}^{N} \|I_k^D - \hat{I}_k^D\| + \sum_{k=1}^{N} \|I_k^S - \hat{I}_k^S\|$$

$$= \sum_{k=1}^{N} \left\{ \sum_x \sum_y w_D(x,y) |I_k^D(x,y) - \hat{I}_k^D(x,y)| \right\} +$$

$$\sum_{k=1}^{N} \left\{ \sum_x \sum_y w_S(x,y) |I_k^S(x,y) - \hat{I}_k^S(x,y)| \right\}$$

$$= E_D + E_S$$

where $I_k$ is a k-th input image, $I_k^D$, $I_k^S$ are diffuse reflection image and specular reflection image of the k-th input image, respectively, $\hat{I}_k$, $\hat{I}_k^D$, $\hat{I}_k^S$ are reconstructed images, and $E_D$ and $E_S$ are diffuse reflection error and specular reflection error, respectively. The weighting values $w_D$ and $w_S$ in the error index equation are defined as follows:

$$w_D(x,y) = (1 - a(x,y)) \cdot w_{MD}(x,y) \cdot w_{SD}(x,y),$$

$$w_S(x,y) = w_{MS}(x,y), \qquad \text{[Equation 4]}$$

$$a(x,y) = \begin{cases} 1, & (x,y) \in R_s, \\ 0, & \text{otherwise.} \end{cases}$$

where $w_{MD}$ and $w_{MS}$ are weighting factors reflecting estimation error and quantization errors, and are constant values if it is assumed that quantization effect is uniformly applied to whole regions, and $w_{SD}$ is a weighting factor defined based on the stability of the estimation of image construction variables and is obtained from the phase of the estimated image construction variables on a PQ map.

There are two methods for obtaining the PQ map for the Lambertian surface from three input images: one method obtains the PQ map on the assumption that albedo of the surface is known, and the other method obtains PQ map and albedo without knowing the albedo of the surface. In the techniques described herein, the latter method is applied. However, the described techniques may also be implemented using the former method. Generally, radiance $L_i$ (i=1, 2, 3) on the assumption of the Lambertian surface is given by:

$$L_i = E_i \rho(s_i \cdot n), i = 1, 2, 3,$$

$$s_i = [s_{ix}, s_{iy}, s_{iz}]^T,$$

$$n = [n_x, n_y, n_z]^T. \qquad \text{[Equation 5]}$$

where $E_i$ is a radiance of the i-th light source, $s_i$ is a unit positional vector of the light source and n is a unit normal vector. Equation 5 can be expressed in vector form:

$$\tilde{L} = Sn, \qquad \text{[Equation 6]}$$

$$\tilde{L} = \begin{bmatrix} \frac{L_1}{E_1 \rho} \\ \frac{L_2}{E_2 \rho} \\ \frac{L_3}{E_3 \rho} \end{bmatrix}, S = \begin{bmatrix} s_{1x} & s_{1y} & s_{1z} \\ s_{2x} & s_{2y} & s_{2z} \\ s_{3x} & s_{3y} & s_{3z} \end{bmatrix}, n = \begin{bmatrix} n_x \\ n_y \\ n_z \end{bmatrix}.$$

If $E_1 = E_2 = E_3$, Equation 6 may be expressed as follows:

$$L = E\rho Sn. \qquad \text{[Equation 7]}$$

From Equation 7, the normal vector n is given as follows:

$$n_x = \frac{-E\rho p}{\sqrt{1 + p^2 + q^2}}, \qquad \text{[Equation 8]}$$

$$n_y = \frac{-E\rho q}{\sqrt{1 + p^2 + q^2}}, \; n_z = \frac{-E\rho}{\sqrt{1 + p^2 + q^2}},$$

From Equation 8, surface gradients p and q may be obtained as follows:

$$p = -\frac{n_x}{n_z}, q = -\frac{n_y}{n_z}. \qquad \text{[Equation 9]}$$

Assuming that errors $\epsilon_1, \epsilon_2, \epsilon_3$ are given, from Equation 7, the following equation may be obtained:

$$S^{-1} \cdot \begin{bmatrix} \frac{L_1 \rho}{E} + \epsilon_1 \\ \frac{L_2 \rho}{E} + \epsilon_2 \\ \frac{L_3 \rho}{E} + \epsilon_3 \end{bmatrix} = \begin{bmatrix} n_x \\ n_y \\ n_z \end{bmatrix}. \qquad \text{[Equation 10]}$$

From Equation 10, error vector e is given by:

$$e = \begin{bmatrix} e_1 \\ e_2 \\ e_3 \end{bmatrix} = S^{-1} \cdot \begin{bmatrix} \epsilon_1 \\ \epsilon_2 \\ \epsilon_3 \end{bmatrix}, \qquad \text{[Equation 11]}$$

where the magnitude of the error vector e is given as follows:

$$e^T e = [\epsilon_1 \; \epsilon_2 \; \epsilon_3](S^{-1})^T S^{-1} \begin{bmatrix} \epsilon_1 \\ \epsilon_2 \\ \epsilon_3 \end{bmatrix}, \qquad \text{[Equation 12]}$$

If the condition value ($\Delta_{cond}$) is defined as the determinant of the directional vector S, the condition value is given as follows:

$$\Delta_{cond} = |S| = det(S). \qquad \text{[Equation 13]}$$

If the condition value ($\Delta_{cond}$) is small, this means that the positions of the three light sources are linearly dependent and that a correct solution cannot be obtained because the magnitude of the error vector becomes large in Equation 12. Thus, any three images with different light sources whose condition value ($\Delta_{cond}$) is smaller than a predetermined value are referred to as "ill-conditioned light source pair," and is excluded from the estimation of the image construction variables. If all of the light source pairs that play a role in determining the diffuse reflection components at pixel (x, y) are represented as $S_p(x,y)$, the weighting factor $w_{SD}$ is given by:

$$w_{SD} = \left[ \sum_{p \in S_p(x,y)} \Delta_{cond}(p) \right]^{-1}. \quad \text{[Equation 14]}$$

The error index E can be obtained from Equations 3, 4 and 14. By estimating the image construction variables that make the error index E to be minimum, the reflection characteristic of the brushstroke and image construction can be determined. However, due to the difficulty in obtaining an optimal solution from Equation 3 that is non-linear, the error index E is minimized step-by-step in Equation 3 and the estimated image construction variables are repeatedly updated. In this process, the diffuse reflection image is obtained from the input image and the specular reflection image is separated by using the diffuse reflection image subtracted from the original image. In addition, the normal vector of the surface and diffuse reflection albedo are estimated. In this manner, the image construction variables related to the diffuse reflection image obtained by separating the specular reflection image and the diffuse error ($E_D$) in Equation 3 is minimized. The remaining image construction variables are estimated so that the specular reflection error ($E_S$) is minimized.

Figure 2:
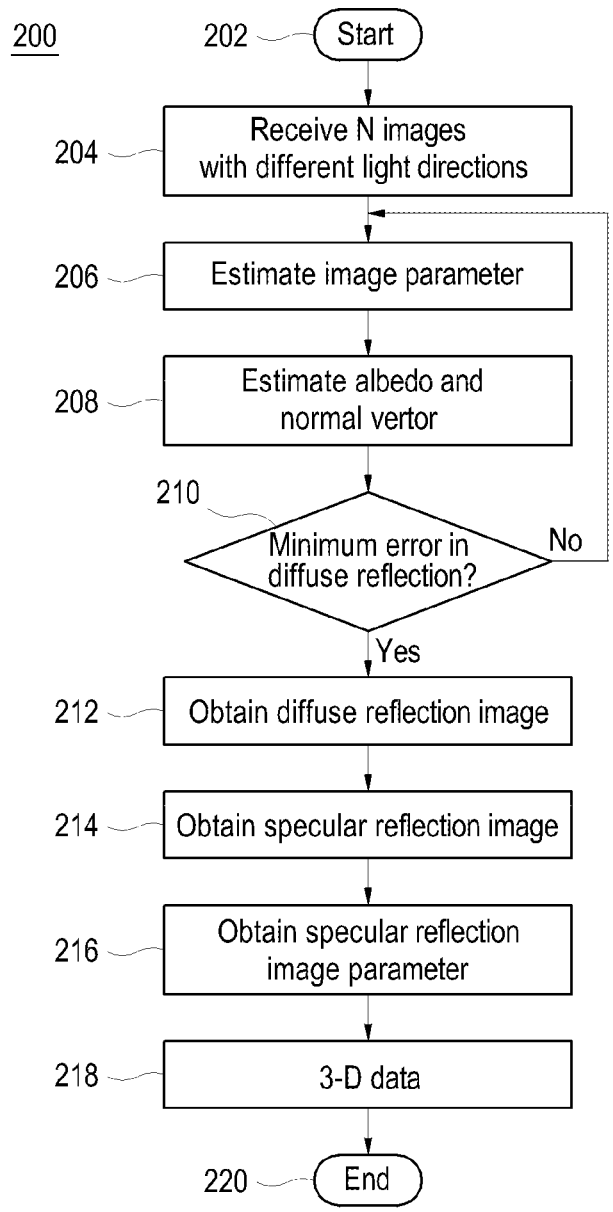
FIG. 2 shows a flow chart of a photometric stereo method using a hybrid reflection model, in accordance with one embodiment.

FIG. 2 illustrates a flow chart of a photometric stereo method 200 using the hybrid reflection model. Method 200 comprises two main operations: obtaining image construction variables of diffuse reflection that minimize a diffuse reflection error; and obtaining image construction variables of specular reflection that minimize a specular reflection error. Beginning in a start block 202, N images for a sample brushstroke taken by camera 104 are received in block 204. From the N images, all the image pairs available for estimating the image construction variables except the ill-conditioned light source pairs are selected. In block 206, the image construction variables are estimated from the selected image pairs, and the specular reflection regions are separated from the image of the sample brushstroke. Since the image construction variables in the pixels of the specular reflection regions cannot be estimated, the image construction variables in this region are determined by using interpolation from neighboring variables. In this operation, all the image pairs for the respective pixels available for the estimation of the image construction variables, except the ill-conditioned light source pairs, are selected.

In block 208, the normal vectors (n) for the respective pixels are estimated and the shadowed regions are separated from the distribution of the normal vectors (n). Given a pixel (x, y), an average vector $n_m$ (x, y) of the normal vectors are obtained from the image pairs for the pixel (x, y) and a variance $n_o(x, y)$. If the variance $n_o(x, y)$ is smaller than a specific threshold, the average vector $n_m(x, y)$ is estimated to be the normal vector of the pixel surface. If the variance $n_o(x, y)$ is larger than a specific threshold, the average vector is repeatedly calculated by excluding the vectors that are far apart from the average, until the variance converges. The threshold may be determined by sensor noise. Using the estimated normal vectors (n), the weighting factor ($w_{SD}$) in Equation 14 is obtained. If the weighting factor is too large, the normal vector n is calculated again for a specific pixel by excluding the component generating a large value in the weighting, factor. In addition, diffuse reflection albedo $\rho_D$ and the normal vector n related to the diffuse reflection are estimated in block 208.

In decision block 210, if a minimum error in diffuse reflection is not obtained, method 200 loops to block 206 to obtain a minimum error in diffuse reflection, for example by using Equation 4. If, in decision block 210, a minimum error in diffuse reflection is obtained, method 200 continues at block 212. In block 212 the diffuse reflection image ($I_k^D$) is obtained by using the diffuse reflection albedo $\rho_D$ and the normal vector n related to the diffuse reflection components obtained in block 208.

In block 214, the specular reflection image ($I_k^S$) is obtained as follows:

$$I_k^S = I_k - I_k^D, \quad \text{[Equation 15]}$$

As shown above in Equation 2, the radiance of the specular reflection image $L_S$ is given by:

$$L_S = \rho_S \frac{\exp(-k\theta^2)}{v \cdot n}, \quad \text{[Equation 16]}$$

$$\theta = \cos^{-1}(h \cdot n).$$

Applying logarithm to Equation 16, the following equation is obtained:

$$\ln L_S + \ln v \cdot n = \ln \rho_S - k\theta^2,$$

$$A = \rho_S' - kB, \quad \text{[Equation 17]}$$

where $A = \ln L_S + \ln v \cdot n$, $\rho_S' = \ln \rho_S$, $B = \theta^2$.

In Equation 17, A and B are known values. Accordingly, in block 216, $\rho_S'$ and k can be obtained by using the least square algorithm for each pixel if more than two values of A and B are given. In block 218, 3D data on the sample brushstroke is generated by synthesizing the diffuse reflection image and the specular reflection image.

Figure 4:
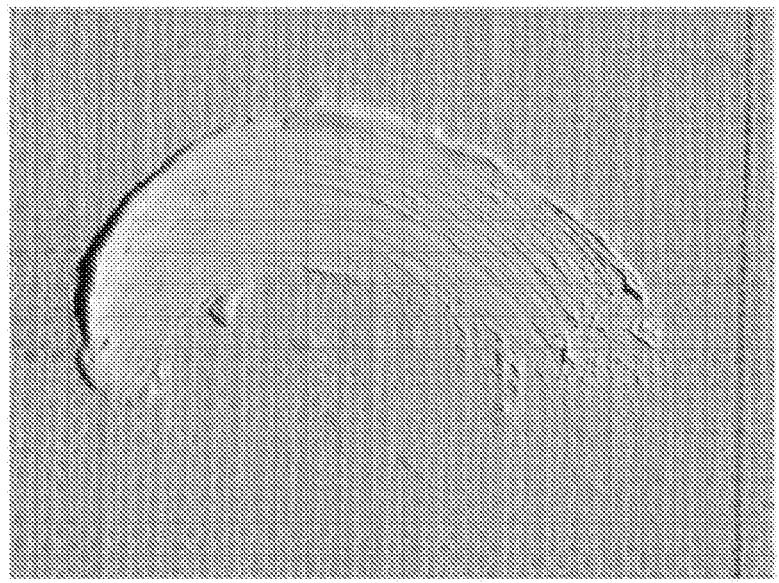
FIGS. 4-6 show an example of a sample brushstroke pattern data obtained by the photometric stereo method, in accordance with one embodiment.
Figure 5:
Figure 6:
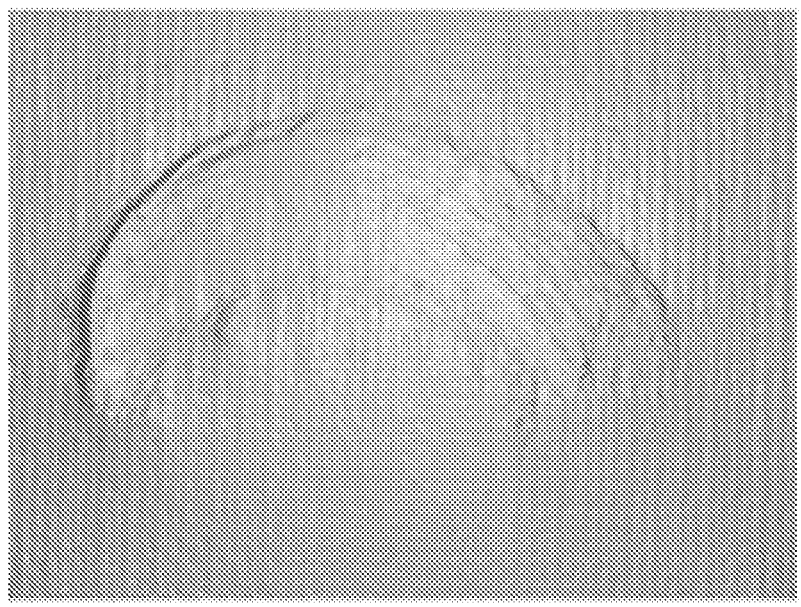
Figure 7:
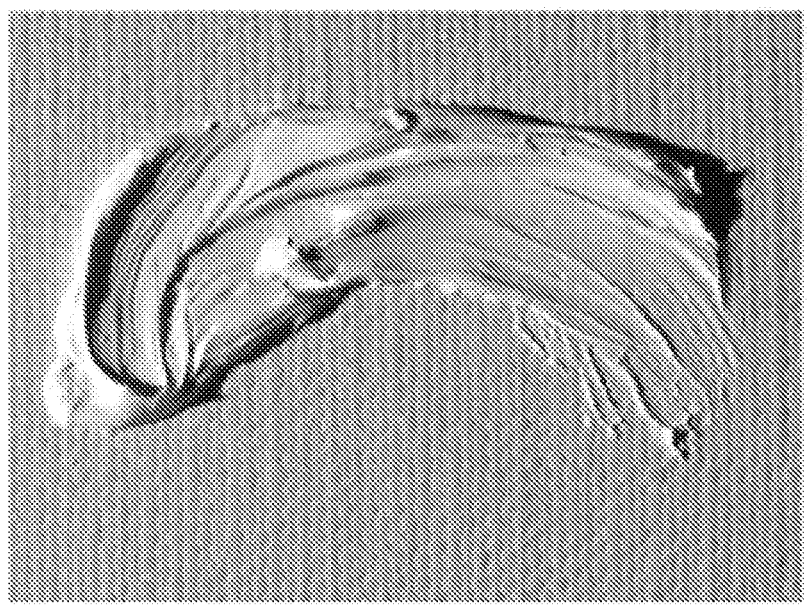
FIGS. 7-9 show another example of a sample brushstroke pattern data obtained by the photometric stereo method, in accordance with one embodiment.
Figure 8:
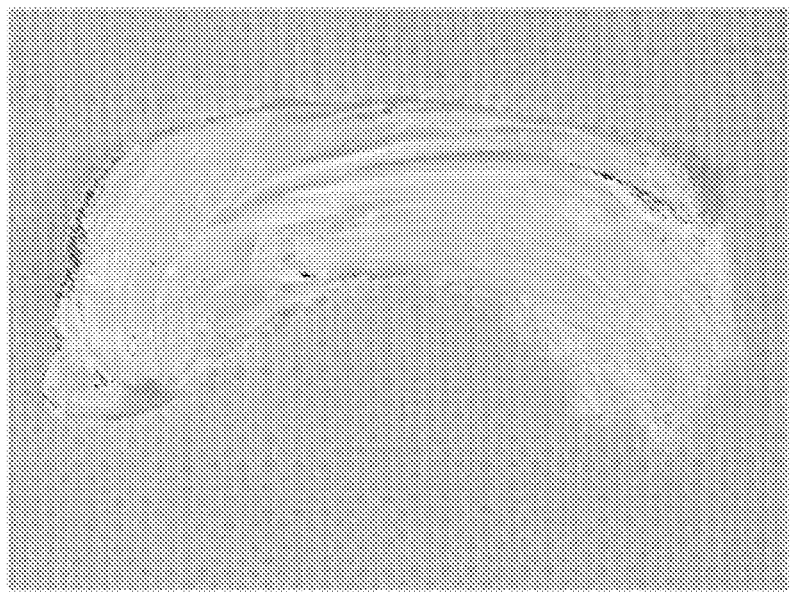
Figure 9:

Through the above-explained operations, the 3D data of sample brushstroke patterns are obtained. FIGS. 4-6 show an example of a sample brushstroke pattern data obtained by photometric stereo method 200 explained above. FIG. 4 shows a 2D image of an actual (i.e., real) sample brushstroke. FIG. 5 shows the albedo of the diffuse reflection component of the sample brushstroke of FIG. 4. FIG. 6 shows a 2D image of the 3D reconstruction result. Similarly, FIGS. 7-9 show another example of a sample brushstroke pattern data obtained by the photometric stereo method, in accordance with one embodiment. Specifically, FIG. 7 shows a 2D image of an actual (i.e., real) sample brushstroke. FIG. 8 shows the albedo of the diffuse reflection component of the sample brushstroke of FIG. 7. FIG. 9 shows a 2D image of the 3D reconstruction result.

Figure 10:
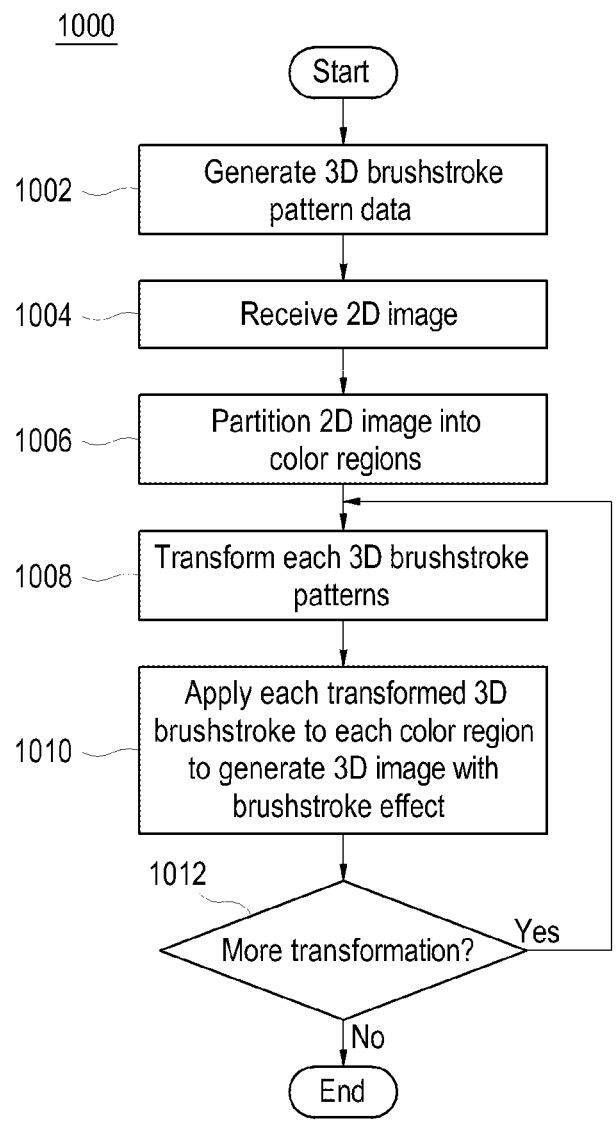
FIGS. 10 and 11 illustrate flow diagrams illustrating the processing for reconstructing 3-dimensional data having texture effects as well as 2-dimensional image, in accordance with one embodiment.

FIG. 10 illustrates a flow diagram of a method 600 for reconstructing 3D data having texture effects, in accordance with one embodiment. In block 1002, 3D brushstroke pattern data is generated for several sample brushstrokes. In one embodiment, the 3D brushstroke pattern data may be generated as described in detail above in conjunction with FIGS. 2-9. In general, oil paintings contain numerous brushstrokes having different shapes and heights to each other. Thus, in order to construct oil painting texture effects through image processing, numerous brushstroke patterns may be used. However, it is inefficient to acquire all the possible brushstroke patterns. In order to obtain the necessary brushstroke pattern data, some transformation may be performed on several of the sample brushstroke pattern data acquired by, for example, the photometric stereo technique as shown in FIGS. 4-9.

In block 1004, a 2D image to be 3-dimensionally reconstructed is captured and received from camera 104. In block 1006, a color segmentation is performed to partition the 2D image into different color regions. Because a typical brushstroke in an oil painting contains one color, a region covered by a brushstroke can be drawn by a single color. Accordingly, in one embodiment, it is assumed that brushstrokes exist inside the boundaries of color regions and there are no brushstrokes crossing the boundary of two different color regions. However, it is noted that the boundaries of color segments may be suitably determined by selecting the appropriate color segmentation parameters. Thus, different 3D reconstruction results for the same input image may be obtained by selecting the color segmentation parameters. For example, the color segmentation parameters may be selected to represent characteristic styles of the artists. The color segmentation (block 1006) is applied to the 2-D input image to extract the homogeneous color regions. In this operation, any conventional color segmentation technique in the image processing field may be used for dividing the input image into a plurality of regions according the colors of the regions. An example of a suitable and commercially available product is the Edge Detection and Image Segmentation (EDISON) System, which uses mean shift based image segmentation.

In one embodiment, for each color region obtained in block 1006, each 3D sample brushstroke obtained in block 1002 is transformed or deformed using, for example, random linear and/or non-linear perspective transformation. An example transformation is given by the following perspective transformation equation:

$$x' = Hpx = \begin{bmatrix} A & t \\ v^T & \upsilon \end{bmatrix} x \quad \text{[Equation 18]}$$

where x is a 3×3 matrix indicating the position (i.e., x, y and z position) of a point to be processed, A is a 2×2 non-singular matrix, t is a translation 2-vector, v $(v_1, v_2)^T$ is a variable vector adjusting the extent of the transformation, and v is a scaling factor. In order to avoid excessive transformation or deformation of brushstroke patterns, linear enlargement of the brushstroke patterns may be limited to α or 1/α times, where α may range between, but not limited to, 1.5-2.

Matrix A is an affine matrix which applies two fundamental transformations, namely rotations and non-isotropic scaling such as non-linear distortion. Affine matrix A can be decomposed as follows:

$$A = R(\theta)R(-\phi)DR(\phi) \quad \text{[Equation 19]}$$

where R(θ) and R(φ) are rotations by angles θ and φ, respectively, and defined as follows:

$$R(\theta) = \begin{bmatrix} \cos\theta & -\sin\theta \\ \sin\theta & \cos\theta \end{bmatrix} \quad \text{[Equation 20]}$$

and where D is a diagonal matrix defined as follows:

$$D = \begin{bmatrix} \lambda_1 & 0 \\ 0 & \lambda_2 \end{bmatrix} \quad \text{[Equation 21]}$$

where $\lambda_1$ and $\lambda_2$ are scaling factors in the rotated x and y directions, respectively.

Figure 12:
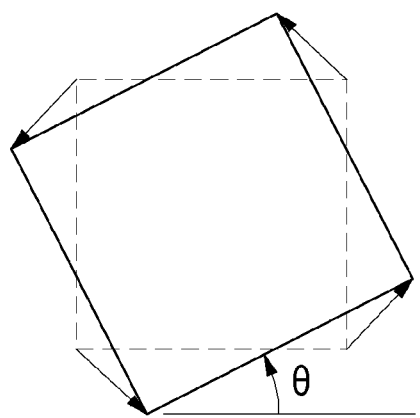
FIGS. 12 and 13 illustrate exemplary perspective transformations, in accordance with one embodiment.
Figure 13:
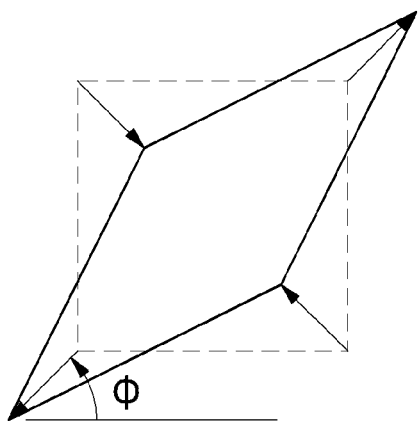

FIGS. 12 and 13 show exemplary distortions arising from the transformation by affine matrix A. Specifically, FIG. 12 illustrates rotation by R(θ), which corresponds to rotating the sample brushstroke pattern obtained in block 1006 of method 1000 by angle θ counterclockwise. FIG. 13 illustrates deformation by R(−φ) D R(φ), which corresponds to rotating the x-axis and y-axis by angle φ and scaling the rotated image by $\lambda_1$ in the rotated x direction and by $\lambda_2$ in the rotated y direction. As shown in FIG. 13, the transformation R(−φ) D R(φ) transforms a square into a rotated parallelogram. It should be noted that any linear and/or non-linear transformation may also be used for perspective transformation performed in block 1008 of method 1000.

Figure 11:
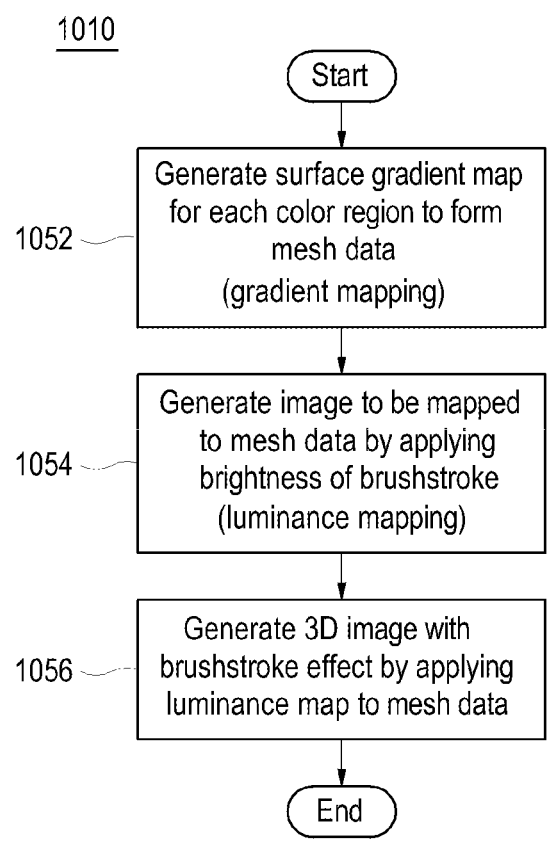

Referring again to FIG. 10, in block 1010, each transformed 3D brushstroke is applied to each color region to generate 3D image with brushstroke effects. FIG. 11 illustrates a flow diagram of a process for applying each transformed 3D brushstroke to each color region. In block 1052, a surface gradient map for each color region is generated to form mesh data (gradient mapping). In block 1054, an image to be mapped to the mesh data is generated by applying brightness of brushstroke (luminance mapping). In block 1056, a 3D image with brushstroke effect is generated by applying luminance map to mesh data. Although FIG. 11 illustrates performing gradient mapping (block 1052) prior to luminance mapping (block 1054), luminance mapping may be performed simultaneously or prior to gradient mapping in other embodiments.

In one embodiment, 3-D structures with brushstroke effects are reconstructed (block 1052) by using gradient mapping. The gradient map for each brushstroke pattern is obtained in photometric stereo method 200, as explained above with reference to FIGS. 2 and 3. In constructing the gradient map corresponding to the reconstructed image with the brushstroke effects, the area where the transformed brushstroke pattern is applied is replaced with the gradient map that corresponds to the transformed brushstroke pattern image, since the brushstroke in oil paintings covers the previous brushstroke in that position. A final gradient map is obtained after applying all the transformed brushstroke patterns. In one embodiment, in order to efficiently reconstruct the corresponding 3-D structure from the gradient map, a surface reconstruction method may be used. However, the described techniques are not limited to a specific surface reconstruction method, and any surface reconstruction method may be used.

In one embodiment, the luminance mapping operation (block 1054) is performed based on the HSI (hue, saturation, intensity) color model. The HSI color model decouples the intensity component from the color-carrying information (hue and saturation) in a color image. For example, human eyes are typically more sensitive to changes in the luminance channel than to changes in color difference channels. Thus, luminance remapping is used to apply the brushstroke effect. In luminance mapping, after processing in luminance space, the color of the output image can be recovered by copying the H and S channels of the input image into the output image. In one embodiment, the albedo value of the diffuse reflection component in the brushstroke patterns acquired by photometric stereo is used to transform the intensity value of the area where each brushstroke pattern is applied. For example, if $y_i$ is the intensity value on a pixel in the area where each brushstroke pattern is applied, and $y_p$ is the intensity value on the corresponding pixel in the brushstroke pattern to be applied, then $y_i$ may be remapped as follows:

$$y_i \leftarrow y_i + \alpha(y_p - \mu_p) \quad \text{[Equation 22]}$$

where $\mu_p$ is the mean intensity values of the brushstroke pattern image, and $\alpha$ is a scaling factor. When the gradient mapping and luminance mapping-operations are completed, 3D image with brushstroke effect may be generated by applying the luminance map to mesh data (block 1056).

Referring again to FIG. 10, one brushstroke pattern is applied to the input image as a result of the operations performed in blocks 1008 and 1010. In decision block 1012, if additional transformation is needed to provide various brushstroke data to the input image, then method 1000 loops to block 1008 to perform additional transformation, else method 1000 ends processing. As explained above, numerous brushstroke patterns may be required for providing oil painting texture effects, and it may be inefficient to acquire all possible brushstroke patterns, for example, in block 1002. Accordingly, the perspective transformation (block 1008) is iteratively changed and used for several sample brushstrokes. For each iteration, at least one of the variables in Equation 19 used in the perspective transformation (i.e., affine matrix A, translation 2-vector t, coefficient vector v, and scaling factor v) may be changed randomly. The number of iterations may be determined so that a sufficient number of the perspective transformation may be performed to provide the oil painting texture effects. For example, the size of the input image and the sample brushstroke may be considered in determining the number of iterations. Further, the brushstroke styles of painters of oil paintings may be considered to determine the number of iterations.

After sufficient iterations, 3-D reconstructed data with texture effects as well as 2-D image of the 3-D structure in one direction is obtained. FIGS. 8 and 9 show results of exemplary 3-D reconstructions with brushstroke texture effects. In FIGS. 8 and 9, three different brushstrokes are used as sample brushstrokes for obtaining the brushstroke pattern data (block 1006 of method 1000). In these examples, the number of iteration performed is 10,000 times, and the sample brushstrokes are repeatedly transformed by random perspective transformation (block 1008 of method 1000).

Figure 14:
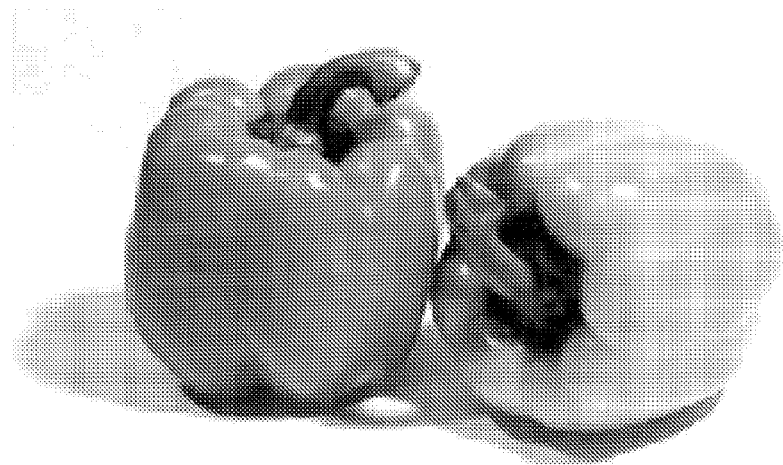
FIGS. 14 and 18 show examples of 2-dimensional input images to which embodiments of the described techniques may be applied.
Figure 15:
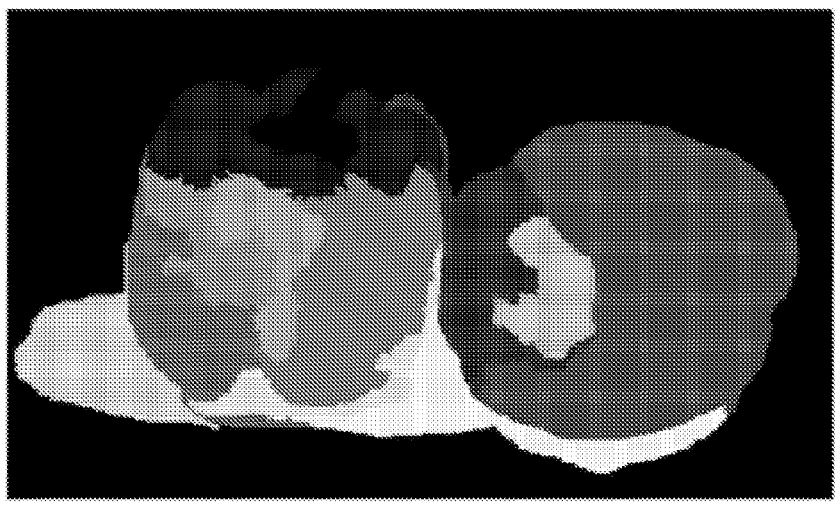
FIGS. 15 and 19 show the results of color segmentation applied to FIGS. 14 and 18 respectively, in accordance with one embodiment.
Figure 16:
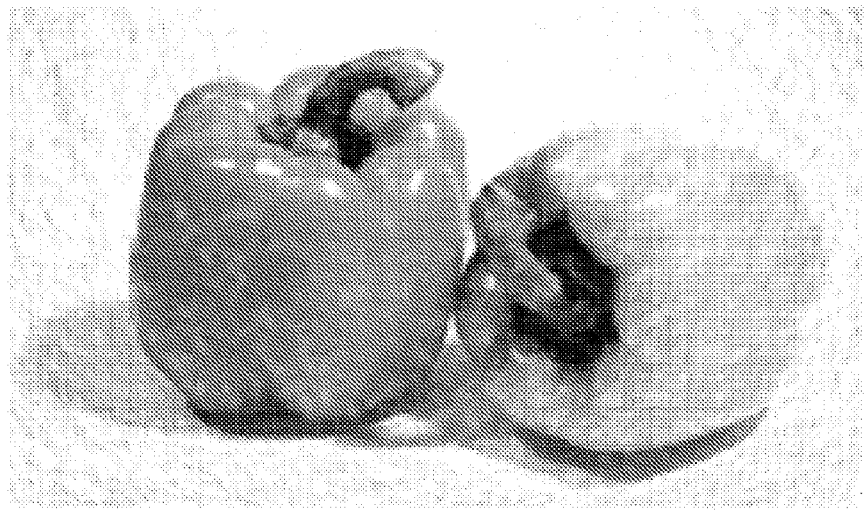
FIGS. 16 and 20 show the 3-D reconstruction results of FIGS. 14 and 18 respectively, in accordance with another embodiment.
Figure 17:
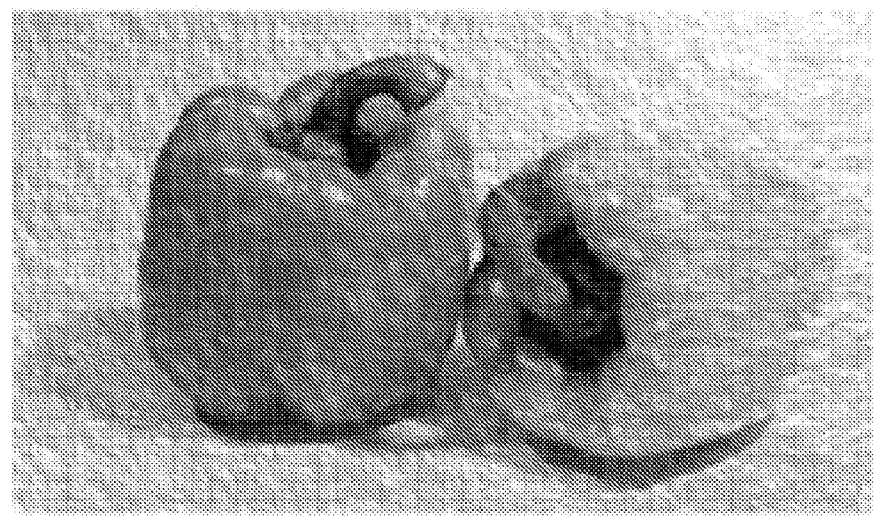
FIGS. 17 and 21 show rendering results having different light conditions from FIGS. 16 and 20, respectively, in accordance with one embodiment.

Specifically, FIG. 14 shows the input image, which is a 2-D image without any texture effects. Through the color segmentation operation 1006, the input image of FIG. 14 is segmented into 12 regions having identical color therein, as show in FIG. 15. FIGS. 16 and 17 illustrate 2-D images of the reconstructed 3-D data with oil painting brushstroke effects. FIG. 17 shows the rendering results in a light condition different from that of FIG. 16. FIGS. 14-17 thus show renderings of 2-D image and 3-D structure data having brushstroke patterns. As shown, the 3-D effects under various light conditions can be obtained efficiently.

Figure 18:
Figure 19:
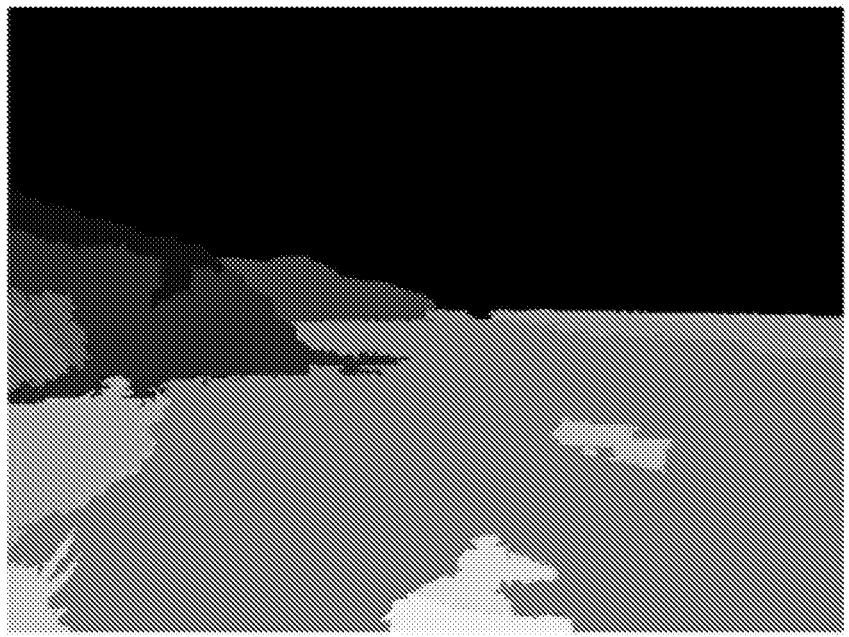
Figure 20:
Figure 21:
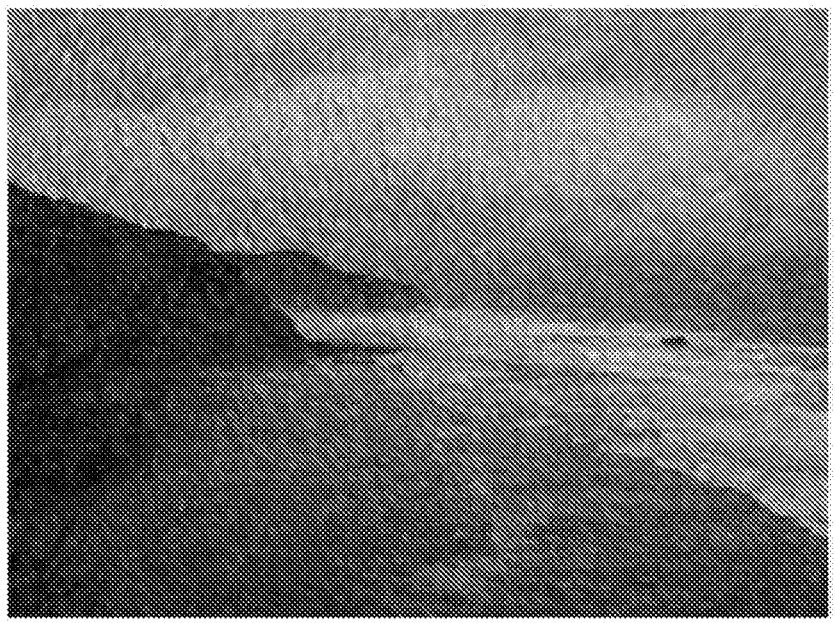

FIGS. 18-21 show the reconstructed images on a seascape. Specifically, FIG. 18 shows a 2-D input image, and FIG. 19 shows the color segmentation result with 13 homogeneous regions. The 3-D reconstruction and the rendering results in different light conditions are shown in FIGS. 20 and 21.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A method for generating three dimensional image data with brushstroke effects from a two dimensional image, comprising:
    generating one or more three dimensional brushstroke patterns from at least one brushstroke;
    partitioning a two dimensional image into one or more color regions;
    for each color region, transforming each three dimensional brushstroke pattern to obtain a brushstroke effect; and
    applying each transformed three dimensional brushstroke pattern to each color region to generate a three dimensional image data having the brushstroke effect, wherein the applying further comprises
    generating a surface gradient map for each color region that is used to create mesh data, and
    generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

2. The method of claim 1, wherein the applying further comprises:
    applying the brushstroke image to the mesh data.

3. The method of claim 1, wherein the generating of the brushstroke image to be mapped to the mesh data comprises performing a luminance mapping.

4. The method of claim 3, wherein the performing of the luminance mapping comprises applying a brightness of the brushstroke to the mesh data.

5. The method of claim 1, further comprising:
    repeating the transforming of each three dimensional brushstroke pattern and the applying of each transformed three dimensional brushstroke pattern a predetermined number of times.

6. The method of claim 1, wherein the generating of the one or more three dimensional brushstroke patterns further comprises:
    obtaining each three dimensional brushstroke pattern from at least one sample brushstroke image; and
    performing an iteratively perspective transformation to each three dimensional brushstroke pattern of said at least one sample brushstroke.

7. The method of claim 1, wherein the transformation of each three dimensional brushstroke pattern is a perspective transformation.

8. The method of claim 1, wherein the generating of the surface gradient map for each color region to create the mesh data comprises obtaining the surface gradient map using a photometric stereo method.

9. A method for reconstructing three dimensional image data with brushstroke effects from a two dimensional image, comprising:
    segmenting a two dimensional image into one or more color regions;
    generating three dimensional brushstroke pattern data of at least one sample brushstroke;
    for each color region, transforming the three dimensional brushstroke pattern data to generate a deformed three-dimensional brushstroke pattern data; and applying the transformed three dimensional brushstroke pattern data to each color region to generate a three dimensional image data,
  wherein the applying further comprises
    generating a surface gradient map for each color region that is used to create mesh data, and
    generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

10. The method of claim 9, wherein the applying further comprises:
  applying the brushstroke image to the mesh data.

11. The method of claim 9, wherein the generating of the brushstroke image to be mapped to the mesh data comprises performing a luminance mapping.

12. The method of claim 11, wherein the performing of the luminance mapping comprises applying a brightness of the brushstroke to the mesh data.

13. The method of claim 9, further comprising repeating the transforming of each three dimensional brushstroke pattern data and the applying of each transformed three dimensional brushstroke pattern data a predetermined number of times.

14. The method of claim 9, wherein the transformation of the three dimensional brushstroke pattern data is a perspective transformation.

15. The method of claim 9, wherein the generating of the brushstroke image to be mapped to the mesh data is performed after the generating of the surface gradient map for each color region to create the mesh data.

16. A method for generating three dimensional image data with brushstroke effects from a two dimensional image, comprising:
  generating one or more three dimensional brushstroke patterns from at least one brushstroke;
  partitioning a two dimensional image into one or more color regions; and
  for each color region,
    transforming each three dimensional brushstroke pattern to obtain a brushstroke effect;
    generating a surface gradient map for each color region that is used to create mesh data;
    generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data; and
    applying the brushstroke image to the mesh data to generate a three dimensional image data having the brushstroke effect.

17. The method of claim 16, wherein the generating of the brushstroke image to be mapped to the mesh data comprises performing a luminance mapping.

18. The method of claim 17, wherein the performing of the luminance mapping comprises applying a brightness of the brushstroke to the mesh data.

19. The method of claim 16, further comprising repeating the transforming of each three dimensional brushstroke pattern a predetermined number of times.

20. The method of claim 16, wherein the generating of the one or more three dimensional brushstroke patterns further comprises:
  obtaining each three dimensional brushstroke pattern from at least one sample brushstroke image; and
  performing an iteratively perspective transformation to each three dimensional brushstroke pattern of said at least one sample brushstroke.

21. The method of claim 18, wherein each three dimensional brushstroke pattern is transformed by a perspective transformation.

22. A non-transitory computer readable medium storing computer executable code that performs a method comprising the steps of:
  generating one or more three dimensional brushstroke patterns from at least one brushstroke;
  partitioning a two dimensional image into one or more color regions;
  for each color region, transforming each three dimensional brushstroke pattern to obtain a brushstroke effect; and
  applying each transformed three dimensional brushstroke pattern to each color region to generate a three dimensional image data having the brushstroke effect, wherein the applying further comprises
    generating a surface gradient map for each color region that is used to create mesh data, and
    generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

23. The non-transitory computer readable medium of claim 22, wherein the applying further comprises:
  applying the brushstroke image to the mesh data.

24. The non-transitory computer readable medium of claim 22, wherein the generating of the brushstroke image to be mapped to the mesh data comprises performing a luminance mapping.

25. The non-transitory computer readable medium of claim 24, wherein the performing of the luminance mapping comprises applying a brightness of the brushstroke to the mesh data.

26. The non-transitory computer readable medium of claim 22, further comprising repeating the transforming of each three dimensional brushstroke pattern and the applying each of transformed three dimensional brushstroke pattern a predetermined number of times.

27. The non-transitory computer readable medium of claim 22, wherein the generating of the one or more three dimensional brushstroke patterns further comprises:
  obtaining each three dimensional brushstroke pattern from at least one sample brushstroke image; and
  performing an iteratively perspective transformation to each three dimensional brushstroke pattern of said at least one sample brushstroke.

28. The non-transitory computer readable medium of claim 22, wherein the transformation of each three dimensional brushstroke pattern is a perspective transformation.

29. The non-transitory computer readable medium of claim 22, wherein the applying further comprises the generating of the three dimensional image data having the brushstroke effect after the generating of the surface gradient map for each color region that is used to create the mesh data.

30. A non-transitory computer readable medium storing computer executable code that performs a method comprising the steps of:

segmenting a two dimensional image into one or more color regions;

generating three dimensional brushstroke pattern data of at least one sample brushstroke;

for each color region, transforming the three dimensional brushstroke pattern data to generate a deformed three-dimensional brushstroke pattern data; and applying the transformed three dimensional brushstroke pattern data to each color region to generate a three dimensional image data, wherein the applying further comprises generating a surface gradient map for each color region that is used to create mesh data, and generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

31. The non-transitory computer readable medium of claim 30, wherein the applying of each transformed three dimensional brushstroke pattern for each color region further comprises:

applying the brushstroke image to the mesh data.

32. The non-transitory computer readable medium of claim 30, wherein the generating of the brushstroke image to be mapped to the mesh data comprises performing a luminance mapping.

33. The non-transitory computer readable medium of claim 32, wherein the performing of the luminance mapping comprises applying a brightness of the brushstroke to the mesh data.

34. The non-transitory computer readable medium of claim 30, further comprising repeating the transforming of each three dimensional brushstroke pattern data and the applying of each transformed three dimensional brushstroke pattern data a predetermined number of times.

35. The non-transitory computer readable medium of claim 30, wherein the transformation of the three dimensional brushstroke pattern data is a perspective transformation.

36. The non-transitory computer readable medium of claim 30, wherein the generating of the brushstroke image to be mapped to the mesh data is performed prior to the generating of the surface gradient map for each color region to create the mesh data.

37. A non-transitory computer readable medium storing computer executable code that performs a method comprising the steps of:

generating one or more three dimensional brushstroke patterns from at least one brushstroke;

partitioning a two dimensional image into one or more color regions; and for each color region, transforming each three dimensional brushstroke pattern to obtain a brushstroke effect;

generating a surface gradient map for each color region that is used to create mesh data;

generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data; and applying the brushstroke image to the mesh data to generate a three dimensional image data having the brushstroke effect.

38. The non-transitory computer readable medium of claim 37, wherein the generating of the brushstroke image to be mapped to the mesh data comprises performing a luminance mapping.

39. The non-transitory computer readable medium of claim 38, wherein the performing of the luminance mapping comprises applying a brightness of the brushstroke to the mesh data.

40. The non-transitory computer readable medium of claim 37, further comprising repeating the transforming of each three dimensional brushstroke pattern a predetermined number of times.

41. The non-transitory computer readable medium of claim 37, wherein the generating of the one or more three dimensional brushstroke patterns further comprises:

obtaining each three dimensional brushstroke pattern from at least one sample brushstrokes images; and performing iteratively perspective transformation to each three dimensional brushstroke pattern of said at least one sample brushstrokes.

42. The non-transitory computer readable medium of claim 37, wherein each three dimensional brushstroke pattern is transformed by a perspective transformation.

43. An apparatus for generating three dimensional image data with brushstroke effects from a two dimensional image, comprising:

a processor, configured to perform the operations of:

generating one or more three dimensional brushstroke patterns from at least one brushstroke;

partitioning a two dimensional image into one or more color regions;

for each color region, transforming each three dimensional brushstroke pattern to obtain a brushstroke effect; and applying each transformed three dimensional brushstroke pattern to each color region to generate a three dimensional image data having the brushstroke effect, wherein the applying further comprises generating a surface gradient map for each color region that is used to create mesh data, and generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

44. The apparatus of claim 43, wherein the applying further comprises:

applying the brushstroke image to the mesh data.

45. The apparatus of claim 43, wherein the generating of the brushstroke image to be mapped to the mesh data comprises performing a luminance mapping.

46. The apparatus of claim 43, wherein the generating of the one or more three dimensional brushstroke patterns further comprises:

obtaining each three dimensional brushstroke pattern from at least one sample brushstroke image; and performing an iteratively perspective transformation to each three dimensional brushstroke pattern of said at least one sample brushstroke.

47. The apparatus of claim 43, wherein the applying further comprises
    performing a luminance mapping by the generating of the brushstroke image to be mapped to the mesh data, and
    generating the three dimensional image data having the brushstroke effect by applying a luminance map to the mesh data.

48. An apparatus for reconstructing three dimensional image data with brushstroke effects from a two dimensional image, comprising:
    a processor, configured to perform the operations of:
        segmenting a two dimensional image into one or more color regions;
        generating three dimensional brushstroke pattern data of at least one sample brushstroke;
        for each color region, transforming the three dimensional brushstroke pattern data to generate a deformed three-dimensional brushstroke pattern data; and
    applying the transformed three dimensional brushstroke pattern data to each color region to generate a three dimensional image data,
    wherein the applying further comprises
        generating a surface gradient map for each color region that is used to create mesh data, and
        generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data.

49. The apparatus of claim 48, wherein the generating of the brushstroke image to be mapped to the mesh data comprises performing a luminance mapping.

50. The apparatus of claim 48, wherein the generating of the brushstroke image to be mapped to the mesh data is performed simultaneously to the generating of the surface gradient map for each color region to create the mesh data.

51. An apparatus for generating three dimensional image data with brushstroke effects from a two dimensional image, comprising:
    a processor, configured to perform the operations of:
        generating one or more three dimensional brushstroke patterns from at least one brushstroke;
        partitioning a two dimensional image into one or more color regions; and
        for each color region,
        transforming each three dimensional brushstroke pattern to obtain a brushstroke effect;
        generating a surface gradient map for each color region that is used to create mesh data;
        generating a brushstroke image to be mapped to the mesh data based on an intensity value of a pixel where a transformed three dimensional brushstroke pattern is to be applied, an intensity value of a corresponding pixel of a transformed three dimensional brushstroke pattern to be applied, and a mean intensity value of the brushstroke image to be mapped to the mesh data; and
        applying the brushstroke image to the mesh data to generate a three dimensional image data having the brushstroke effect.

52. The apparatus of claim 51, wherein the generating of the brushstroke image to be mapped to the mesh data comprises performing a luminance mapping.

53. The apparatus of claim 51, wherein the generating of the one or more three dimensional brushstroke patterns further comprises:
    obtaining each three dimensional brushstroke pattern from at least one sample brushstrokes image; and
    performing iteratively perspective transformation to each three dimensional brushstroke pattern of said at least one sample brushstrokes.

\* \* \* \* \*